(12) United States Patent
Xu

(10) Patent No.: US 12,477,200 B2
(45) Date of Patent: Nov. 18, 2025

(54) CAMERA ASSEMBLY WITH ANTI-SHAKE AND ELECTRONIC DEVICE

(71) Applicant: VIVO MOBILE COMMUNICATION CO., LTD., Guangdong (CN)

(72) Inventor: Nenghua Xu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 174 days.

(21) Appl. No.: 18/486,356

(22) Filed: Oct. 13, 2023

(65) Prior Publication Data

US 2024/0040219 A1 Feb. 1, 2024

Related U.S. Application Data

(63) Continuation of application No. PCT/CN2022/085806, filed on Apr. 8, 2022.

(30) Foreign Application Priority Data

Apr. 13, 2021 (CN) .......................... 202110393943.5

(51) Int. Cl.
*H04N 5/335* (2011.01)
*H04N 23/51* (2023.01)
(Continued)

(52) U.S. Cl.
CPC .............. *H04N 23/54* (2023.01); *H04N 23/51* (2023.01); *H05K 1/028* (2013.01); *H05K 1/14* (2013.01)

(58) Field of Classification Search
CPC .................................................... H05K 1/147
See application file for complete search history.

(56) References Cited

U.S. PATENT DOCUMENTS

| 11,555,978 B2 * | 1/2023 | Lim | H04N 23/54 |
| 12,066,641 B2 * | 8/2024 | Sue | H05K 1/028 |

(Continued)

FOREIGN PATENT DOCUMENTS

| CN | 104635401 A | 5/2015 |
| CN | 104914544 A | 9/2015 |

(Continued)

OTHER PUBLICATIONS

First Office Action for Chinese Application No. 202110393943.5, dated Jan. 24, 2022, 9 Pages.

(Continued)

*Primary Examiner* — Gary C Vieaux
(74) *Attorney, Agent, or Firm* — BROOKS KUSHMAN P.C.

(57) ABSTRACT

A camera assembly and an electronic device. The camera assembly includes: a first circuit board, a flexible circuit board, a base, a plurality of first elastic members, a first coil, and a photosensitive chip; fixed ends of the plurality of first elastic members are fixedly mounted on the base, and free ends of the plurality of first elastic members are suspended; the first circuit board is mounted on a suspension rack formed by the plurality of first elastic members, and the first coil and the photosensitive chip are provided on the first circuit board; one end of the flexible circuit board is fixedly connected to the first circuit board, and the other end of the flexible circuit board is fixedly connected to the base.

12 Claims, 4 Drawing Sheets

(51) Int. Cl.
  *H04N 23/54* (2023.01)
  *H05K 1/02* (2006.01)
  *H05K 1/14* (2006.01)

(56) References Cited

U.S. PATENT DOCUMENTS

| | | | |
|---|---|---|---|
| 2007/0212060 A1* | 9/2007 | Huang | G03B 9/08 |
| | | | 396/463 |
| 2015/0264240 A1 | 9/2015 | Chan | |
| 2016/0161757 A1 | 6/2016 | Hee et al. | |
| 2018/0203203 A1* | 7/2018 | Lee | H02K 41/0356 |
| 2019/0141248 A1* | 5/2019 | Hubert | H02K 41/0356 |
| 2019/0289180 A1 | 9/2019 | Wang | |
| 2020/0120242 A1 | 4/2020 | Wade | |
| 2020/0196447 A1 | 6/2020 | Mak | |
| 2021/0051258 A1 | 2/2021 | Bjorstrom et al. | |
| 2021/0321024 A1* | 10/2021 | Song | H04N 23/687 |
| 2022/0086317 A1* | 3/2022 | Paik | H04N 23/55 |

FOREIGN PATENT DOCUMENTS

| | | |
|---|---|---|
| CN | 107315302 A | 11/2017 |
| CN | 108174078 A | 6/2018 |
| CN | 210041609 U | 2/2020 |
| CN | 211266979 U | 8/2020 |
| CN | 112468732 A | 3/2021 |
| CN | 112822376 A | 5/2021 |
| CN | 113114896 A | 7/2021 |
| CN | 113259568 A | 8/2021 |
| CN | 214045750 U | 8/2021 |
| JP | 2020060726 A | 4/2020 |
| JP | 2020170170 A | 10/2020 |
| KR | 20200058815 A | 5/2020 |
| WO | 2017049579 A1 | 3/2017 |
| WO | 2019037160 A1 | 2/2019 |

OTHER PUBLICATIONS

International Search Report and Written Opinion for Application No. PCT/CN2022/085806, dated Jun. 8, 2022, 11 Pages.
Extended European Search Report for Application No. 22787451.8, dated Sep. 23, 2024, 9 Pages.
First Office Action for Japanese Application No. 2023-559821, dated Dec. 3, 2024, 14 Pages.
Second Japanese Office Action for Japanese Patent Application No. 2023-559821 mailed May 13, 2025. 8 pages.

* cited by examiner

CAMERA ASSEMBLY WITH ANTI-SHAKE AND ELECTRONIC DEVICE

CROSS-REFERENCE TO RELATED APPLICATIONS

This application is a continuation of PCT International Application No. PCT/CN2022/085806 filed on Apr. 8, 2022, which claims priority to Chinese Patent Application No. 202110393943.5 filed on Apr. 13, 2021, which are incorporated herein by reference in their entireties.

TECHNICAL FIELD

This application belongs to the technical field of images, and specifically relates to a camera assembly and an electronic device.

BACKGROUND

With the popularity and development of electronic devices represented by smart phones, more and more people are using electronic devices to take photos. When people use the electronic device to take photos, the camera may capture blurred images due to shake.

At present, in order to solve the above problems, some electronic devices are configured with a chip anti-shake function. The chip anti-shake refers to moving a photosensitive chip to compensate for the optical path loss caused by a shaky camera. However, in the above manner, a metal suspension wire is required to suspend the photosensitive chip so as to facilitate the movement of the photosensitive chip, and moreover, it is required to bend the circuit board connected with the photosensitive chip, which greatly increases the assembling difficulty of the camera assembly.

SUMMARY

Embodiments of this application are directed to a camera assembly and an electronic device.

This application is implemented as follows:

In a first aspect, an embodiment of this application provides a camera assembly, including:
a first circuit board, a flexible circuit board, a base, a plurality of first elastic members, a first coil, and a photosensitive chip;
fixed ends of the plurality of first elastic members are fixedly mounted on the base, and free ends of the plurality of first elastic members are suspended;
the first circuit board is mounted on a suspension rack formed by the plurality of first elastic members, and the first coil and the photosensitive chip are provided on the first circuit board;
one end of the flexible circuit board is fixedly connected to the first circuit board, and the other end of the flexible circuit board is fixedly connected to the base,
where being energized, the first coil cooperates with a permanent magnet of a magnetic field where the first coil is located to drive the first circuit board to drive the photosensitive chip to move.

In a second aspect, an embodiment of this application provides an electronic device, including:
a first circuit board, a flexible circuit board, a base, a plurality of first elastic members, a first coil, and a photosensitive chip;
fixed ends of the plurality of first elastic members are fixedly mounted on the base, and free ends of the plurality of first elastic members are suspended;
the first circuit board is mounted on a suspension rack formed by the plurality of first elastic members, and the first coil and the photosensitive chip are provided on the first circuit board;
one end of the flexible circuit board is fixedly connected to the first circuit board, and the other end of the flexible circuit board is fixedly connected to the base,
where being energized, the first coil cooperates with a permanent magnet of a magnetic field where the first coil is located to drive the first circuit board to drive the photosensitive chip to move.

DETAILED DESCRIPTION

Figure 1:
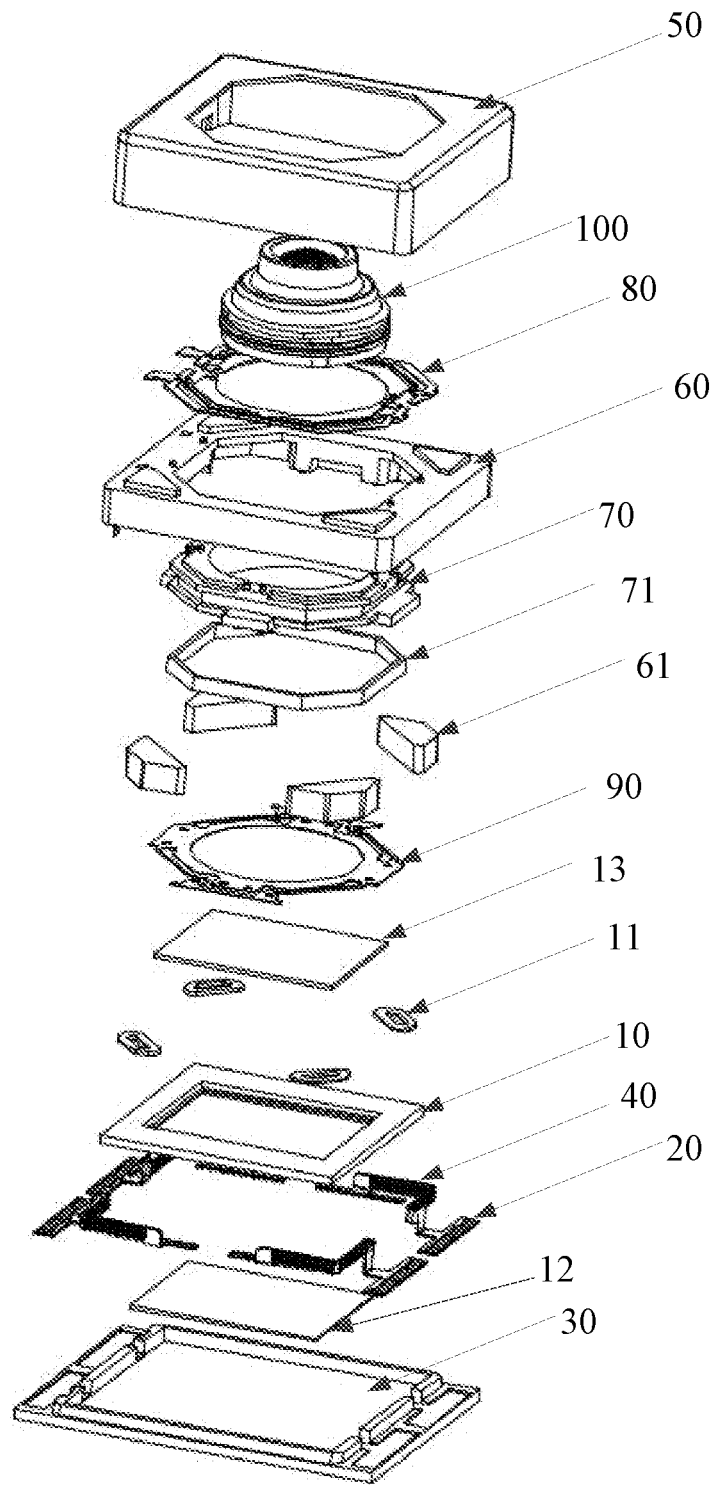
FIG. 1 is an exploded view of a camera assembly according to an embodiment of this application.
Figure 2:
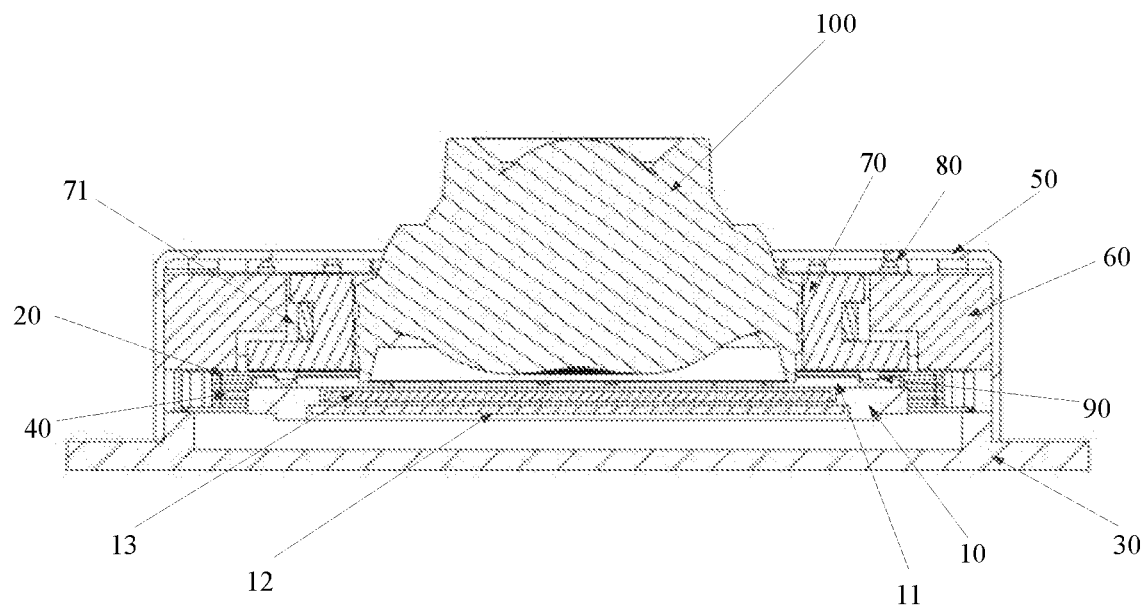
FIG. 2 is a sectional view of the camera assembly according to an embodiment of this application.
Figure 3:
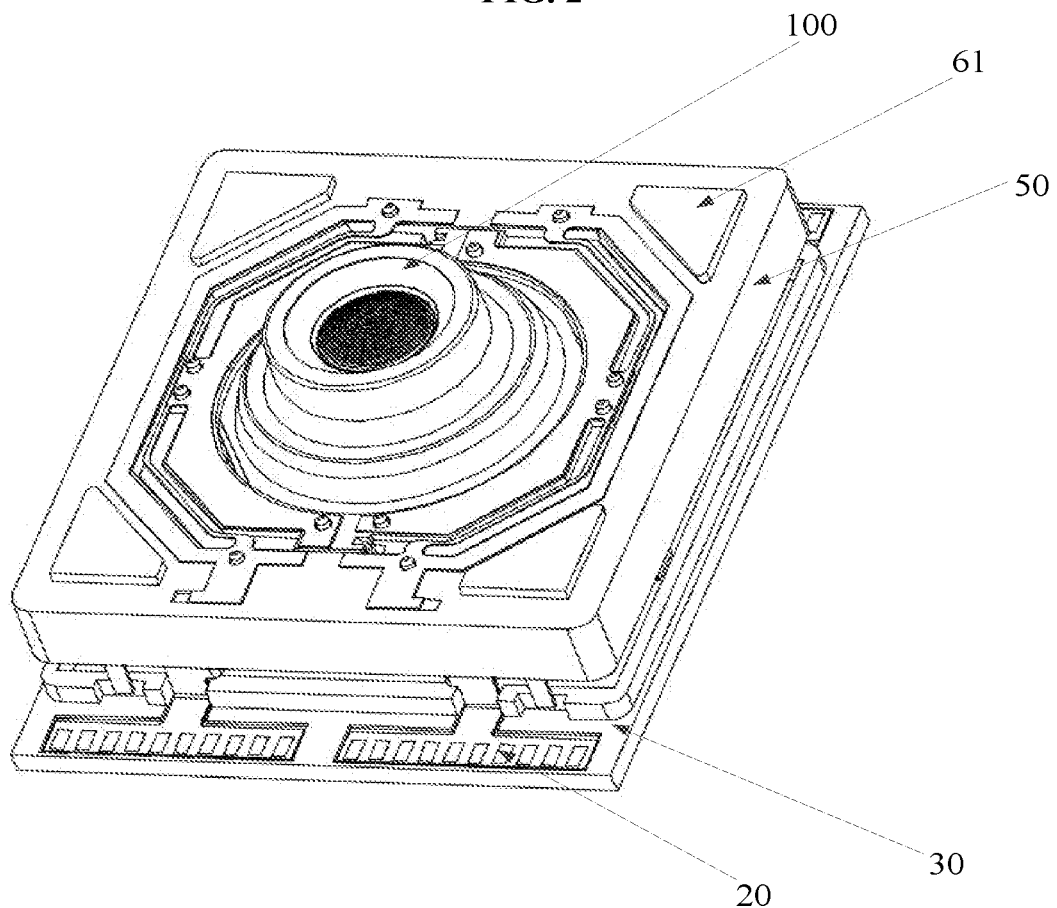
FIG. 3 is a front view of the camera assembly according to an embodiment of this application.

The technical solutions in embodiments of this application are clearly described in the following with reference to the accompanying drawings in the embodiments of this application. Apparently, the described embodiments are merely some rather than all of the embodiments of this application. Based on the embodiments of this application, all other embodiments obtained by ordinary people skilled in the art without making creative efforts shall fall within the protection scope of this application.

The terms "first" and "second" in the specification and claims of this application are used to distinguish similar objects, but are not used to describe a specific sequence or order. It should be understood that the data used as such may be interchanged where appropriate, so that the embodiments of this application can be implemented in a sequence other than those illustrated or described herein. In addition, "and/or" used in this specification and the claims represents at least one of the connected objects, and the character "/" generally indicates an "or" relationship between the associated objects.

Referring to FIG. 1 to FIG. 6, a camera assembly provided by an embodiment of this application includes a first circuit board 10, a flexible circuit board 20, a base 30, a plurality of first elastic members 40, a first coil 11, and a photosensitive chip 12. Fixed ends 41 of the plurality of first elastic members 40 are fixedly mounted on the base 30, and free ends 42 of the plurality of first elastic members 40 are suspended. The first circuit board 10 is mounted on a suspension rack formed by the plurality of first elastic members 40, and the first coil 11 and the photosensitive chip 12 are provided on the first circuit board 10. One end of the flexible circuit board 20 is fixedly connected to the first circuit board 10, and the other end of the flexible circuit board 20 is fixedly connected to the base 30.

In this embodiment, the first circuit board 10 may be made of a ceramic material or other materials. The first circuit board 10 may be a circuit substrate or a flexible circuit board. A circuit is arranged inside the first circuit board 10, and the photosensitive chip 12 and the first coil 11 on the first circuit board 10 are electrically connected by means of the internal circuit.

As described above, one end of the flexible circuit board 20 is fixedly connected to the first circuit board 10, and the other end of the flexible circuit board 20 is fixedly connected to the base 30. In this way, the flexible circuit board 20 can be electrically connected to an element other than the camera assembly by means of the end connected to the base 30, and the flexible circuit board 20 can be electrically connected to the first circuit board 10 by means of the end connected to the first circuit board 10.

The base 30 may be made of a liquid crystal polymer (LCP) material or other materials, which is not limited here.

The first elastic member 40 may be a spring. The first elastic member 40 may be formed from a conventional alloy material such as iron and copper by etching and bending. The fixed ends 41 of the first elastic members 40 are fixedly mounted on the base 30. Optionally, the fixed ends 41 of the first elastic members 40 may be fixed to the base 30 by means of bonding. The free ends 42 of the first elastic member 40 are suspended to form the suspension rack. The first circuit board 10 is placed on the suspension rack, so that the whole first circuit board 10 is suspended. In this way, the suspended first circuit board 10 can move freely without being limited by external force.

Optionally, the first elastic members 40 are perpendicular to the base 30, which can reduce the internal space occupied by the first elastic members 40, thereby reducing the stacked thickness of the whole electronic device.

The first coil 11 is also called an anti-shake coil. The first coil 11 may be fixed to the first circuit board 10 by means of welding.

The photosensitive chip 12 may be arranged on the first circuit board 10 by a flip chip process. The photosensitive chip 12 is configured to convert a received optical signal into an electrical signal to form the captured image.

It should be understood that the camera assembly in this embodiment is further provided with a permanent magnet 61. The permanent magnet 61 generates a magnetic field. All components in the camera assembly are located in the magnetic field. Being energized, the first coil 11 generates an Ampere force that drives the first circuit board 10 under the action of the magnetic field generated by the permanent magnet 61.

The application principle of this embodiment is: being energized, the first coil 11 cooperates with the permanent magnet 61 to generate the Ampere force which drives the first circuit board 10 to move, thereby driving the photosensitive chip 12 to move and further realizing chip anti-shake.

In the embodiments of this application, the free ends 42 of the plurality of first elastic members 40 are suspended, and the first circuit board 10 provided with the photosensitive chip 12 is mounted on the suspension rack formed by the plurality of first elastic members 40, so that the first circuit board 10 can be suspended. Moreover, the first circuit board 10 can be suspended without using a metal suspension wire. In addition, in the embodiments of this application, one end of the flexible circuit board is fixedly connected to the first circuit board 10, and the other end of the flexible circuit board is fixedly connected to the base 30, so that there is no need to bend the flexible circuit board. In this way, the assembling difficulty of the camera assembly is reduced.

Optionally, the number of the first elastic members 40 is four. The first circuit board 10 is a rectangular circuit board, and the first elastic members 40 are located at four corners of the first circuit board 10.

Figure 4:
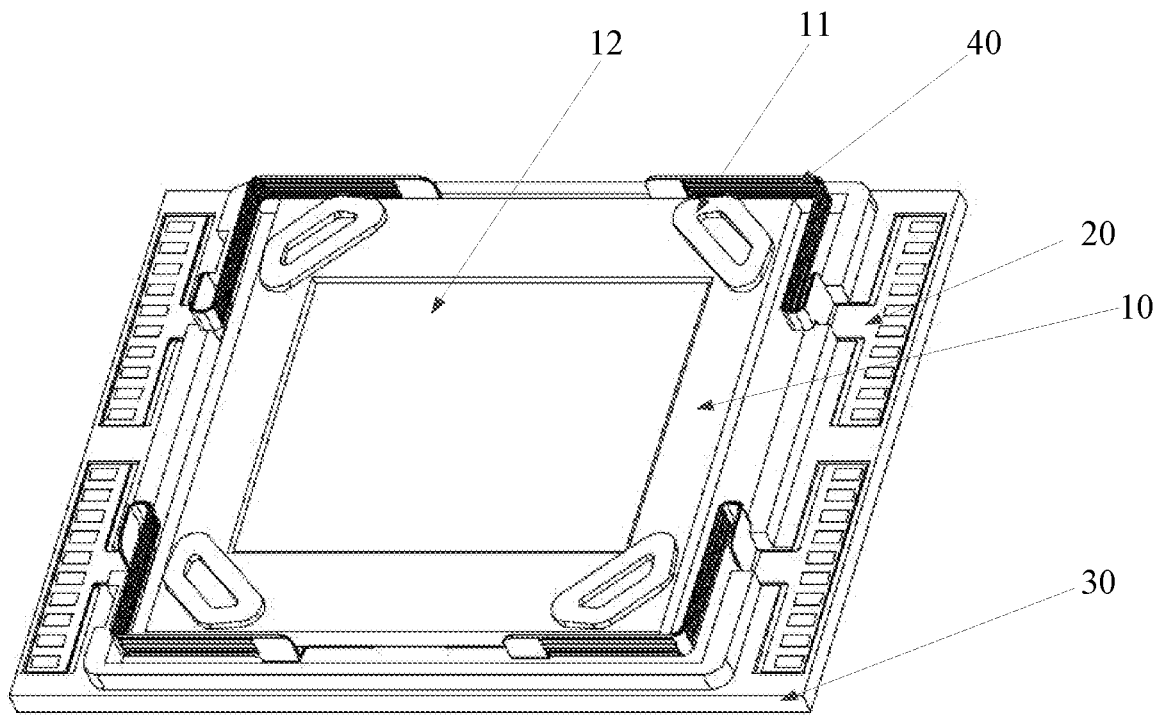
FIG. 4 is a front view of a first circuit board according to an embodiment of this application.

Referring to FIG. 4, FIG. 4 is a front view of a first circuit board according to an embodiment of this application. As shown in FIG. 4, the first circuit board 10 is a rectangular circuit board. The number of the first elastic members 40 is four, and the four first elastic members 40 are located at the four corners of the rectangular circuit board. The first elastic members 40 located at the four corners of the rectangular circuit board may move along diagonals of the rectangular circuit board. In this way, the first elastic members 40 located at the four corners of the first circuit board 10 can support the first circuit board 10 to the greatest extent, thereby preventing the first circuit board 10 from falling off the suspension rack during the movement.

It should be understood that the number of the first elastic members 40 may also be two, and the two first elastic members 40 are located on opposite sides of the first circuit board 10.

Optionally, the free ends 42 of the first elastic members 40 are located on a bottom of the first circuit board 10, and the free ends 42 of the first elastic members 40 are fixedly connected to the first circuit board 10.

Figure 5:
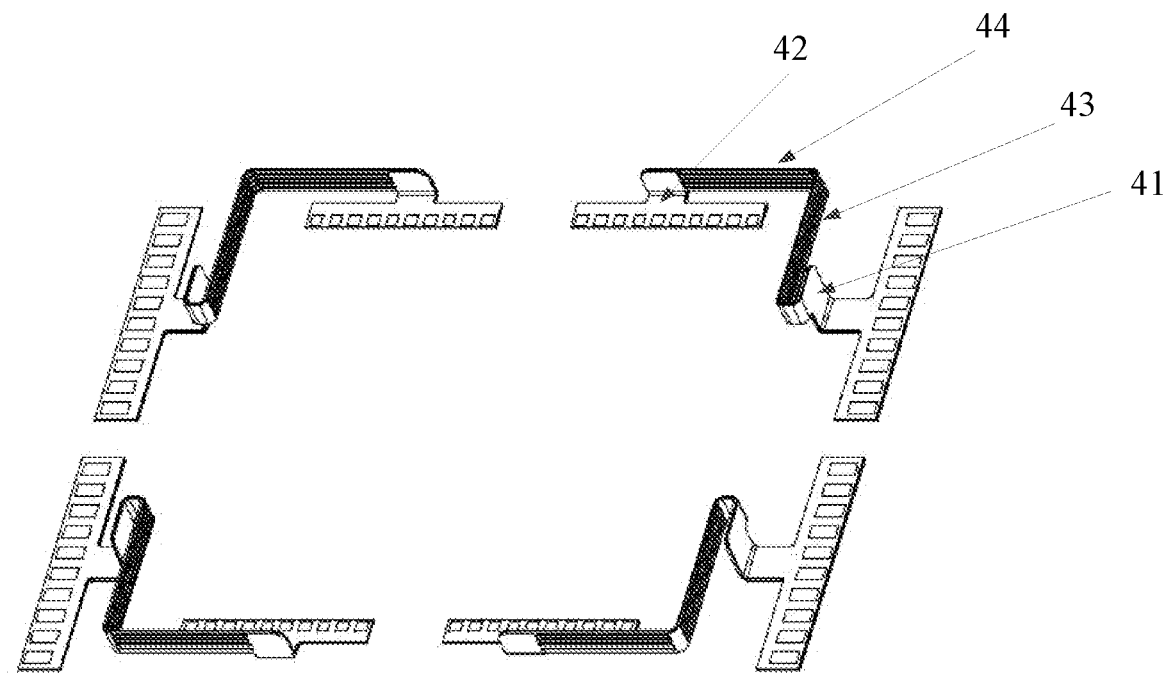
FIG. 5 is a schematic structural view of a first elastic member according to an embodiment of this application.

In this embodiment, referring to FIG. 5, FIG. 5 is a schematic structural view of a first elastic member according to an embodiment of this application. As shown in FIG. 5, the first elastic member 40 includes the fixed end 41 and the free end 42. The free end 42 of the first elastic member 40 is located on the bottom of the first circuit board 10, and the free end 42 of the first elastic member 40 may be fixedly connected to the bottom of the first circuit board 10, so that the first elastic members 40 can carry the first circuit board 10 more stably.

In a case that the number of the first elastic members 40 is four, the free ends 42 of the first elastic members 40 may be arranged on the opposite sides of the first circuit board 10, so that the first elastic members 40 can carry the first circuit board 10 more stably.

Optionally, the first elastic member 40 includes a first connecting portion 43 and a second connecting portion 44. The fixed end 41 is arranged on the first connecting portion 43, and the free end 42 is arranged on the second connecting portion 44. The first connecting portion 43 is located on a first side of the first circuit board 10, and the second connecting portion 44 is located on a second side of the first circuit board 10. The first side and the second side are adjacent sides of the first circuit board 10.

Still referring to FIG. 5, as shown in FIG. 5, the first elastic member 40 includes the first connecting portion 43 and the second connecting portion 44. The fixed end 41 is arranged on the first connecting portion 43, and the free end 42 is arranged on the second connecting portion 44. In a case that the first circuit board 10 is a rectangular circuit board, the first connecting portion 43 may be located on the first side of the first circuit board 10, and the second connecting portion 44 may be located on the second side of the first circuit board 10. The first side and the second side are adjacent sides of the first circuit board 10. In this way, the suspension rack formed by the plurality of first elastic members 40 is rectangular. In other words, the suspension rack has the same shape as the first circuit board 10, which can limit the direction of movement of the first circuit board 10 during the movement of the first circuit board 10, thereby preventing the first circuit board 10 from falling off the suspension rack during the movement.

Optionally, the first connecting portion 43 is attached to the first side of the first circuit board 10, and the second connecting portion 44 is attached to the second side of the first circuit board 10. The first connecting portion 43 and the second connecting portion 44 are perpendicular to each other.

In this embodiment, the first connecting portion 43 of the first elastic member 40 is attached to the first side of the first circuit board 10, and the second connecting portion 44 is attached to the second side of the first circuit board 10. In a case that the first circuit board 10 is a rectangular circuit board, the first connecting portion 43 and the second connecting portion 44 are perpendicular to each other. In this way, when the first circuit board 10 is mounted on the suspension rack, the plurality of first elastic members 40 clamp the first circuit board 10 so as to fix the first circuit board 10 onto the suspension rack.

Optionally, the number of the flexible circuit boards 20 is two. Part of the flexible circuit board 20 is connected to the two first connecting portions 43 located on a same side of the first circuit board 10.

In this embodiment, in the case where the number of the first elastic members 40 is four, the number of the flexible circuit boards 20 may be two. One flexible circuit board 20 may be connected to two first elastic members 40 located on opposite sides of the first circuit board 10. Specifically, one end of the flexible circuit board 20 may be connected to the first connecting portion 43 of one of first elastic members 40, and the other end of the flexible circuit board 20 may be connected to the first connecting portion 43 of another first elastic member 40. Part of the flexible circuit board 20 forms an arch. The two first elastic members 40 mentioned above are arranged opposite to each other.

In this way, during the chip anti-shake process, when the first circuit board 10 moves, the first elastic members 40 move along with the first circuit board 10. Since the two first elastic members 40 arranged opposite to each other carry one flexible circuit board 20, the flexible circuit board 20 also moves along with the first elastic members 40, thereby preventing the flexible circuit board 20 from breaking during the chip anti-shake process. Moreover, there is no need to bend the flexible circuit board 20 into a bent structure, which reduces the assembling difficulty of the camera assembly.

Optionally, in order to reduce the resistance generated during the movement of the flexible circuit board 20, the flexible circuit board 20 is designed as a single-layer circuit board.

In this embodiment, by making the flexible circuit board 20 carried on the first elastic members 40, the flexible circuit board 20 can move along with the first elastic members 40. Moreover, the flexible circuit board 20 is designed as the single-layer circuit board, which can reduce the internal space of the electronic device occupied by the flexible circuit board 20, thereby reducing the stacked thickness of the whole electronic device.

Optionally, a length of the flexible circuit board 20 is greater than a length of the two fixed ends 41 on the same side of the first circuit board 10, thereby increasing the length of the flexible circuit board 20.

Optionally, the base 30 is provided with a protrusion 31, and the protrusion 31 is bonded with part of the flexible circuit board 20.

Figure 6:
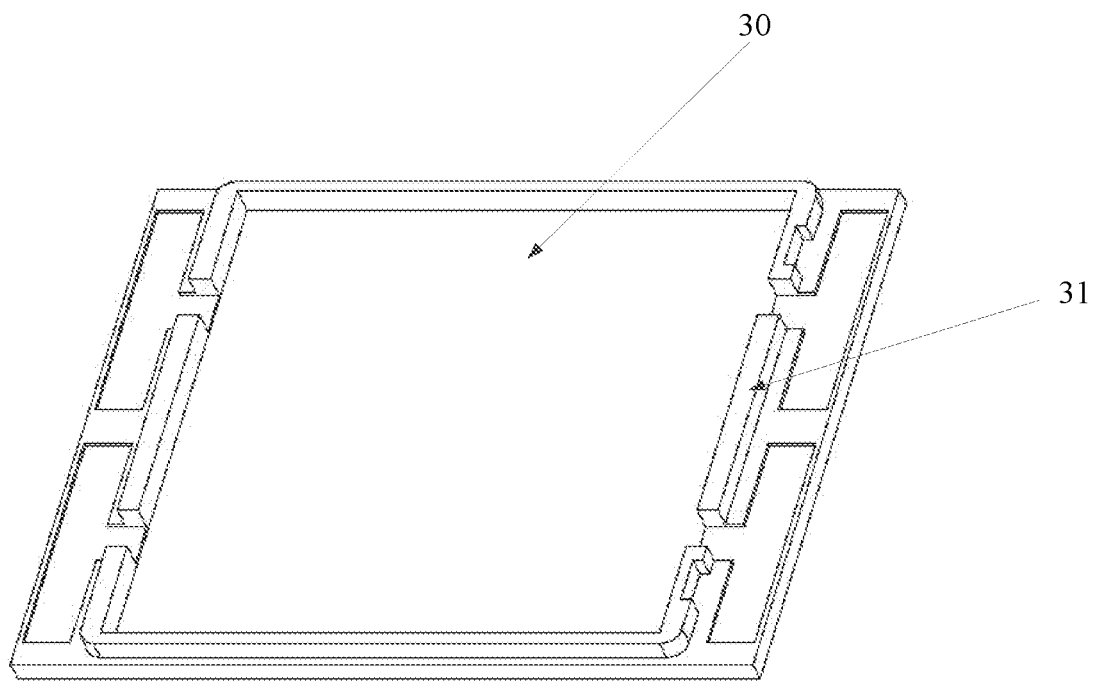
FIG. 6 is a schematic structural view of a base according to an embodiment of this application.

Referring to FIG. 6, FIG. 6 is a schematic structural view of a base according to an embodiment of this application. In this embodiment, the base 30 is provided with the protrusion 31, and the protrusion 31 is a slope. Part of the flexible circuit board 20 is bonded with the protrusion 31 of the base 30. A surface of the flexible circuit board 20 may be bonded with the protrusion 31 of the base 30, thereby preventing the flexible circuit board 20 from breaking during the movement process.

Optionally, the camera assembly further includes a housing 50, a fixed member 60, a moving member 70 and a lens 100.

The housing 50, the fixed member 60 and the moving member 70 are each provided with an opening. The housing 50 and the base 30 form a first accommodating cavity, and the moving member 70 and the fixed member 60 are both located in the first accommodating cavity. The fixed member 60 is fixedly connected to the housing 50, and the moving member 70 is located in the fixed member 60. One end of the lens 100 is bonded with the moving member 70, and the other end of the lens 100 runs through the opening of the housing 50 and is located outside the housing 50.

In this embodiment, the housing 50, the fixed member 60 and the moving member 70 may be made of a liquid crystal polymer material. In this embodiment, one end of the lens 100 is bonded with the moving member 70, and the moving member 70 may move in the fixed member 60, thereby driving the lens 100 to move. In this way, the focusing function of the lens 100 is realized.

Optionally, the camera assembly further includes a filter 13, a second elastic member 80, a third elastic member 90, a second coil 71, and a permanent magnet 61.

The filter 13 is fixedly connected to the first circuit board 10, and the filter 13 is arranged opposite to the photosensitive chip 12. The second elastic member 80, the third elastic member 90, the second coil 71 and the permanent magnet 61 are all located in the first accommodating cavity. The fixed member 60 and the moving member 70 form a second accommodating cavity and a third accommodating cavity on two opposite sides of the moving member 70. The second elastic member 80 is located in the second accommodating cavity, and the second elastic member 80 is perpendicular to the moving member 70. The third elastic member 90 is located in the third accommodating cavity, and the third elastic member 90 is perpendicular to the moving member 70. The second coil 71 is located in a first groove of the moving member 70, and the permanent magnet 61 is located in a second groove of the fixed member 60. The permanent magnet 61 and the second coil 71 are arranged opposite to each other.

As shown in FIG. 1, the camera assembly further includes the filter 13. The filter 13 may be bonded to the first circuit board 10 such that the filter 13 is fixedly connected to the first circuit board 10. The filter 13 may also be fixedly connected to the first circuit board 10 in other manners, which is not limited here.

It should be understood that the filter 13 is configured to filter out specific light to avoid image distortion. Optionally, the filter 13 may be an infrared filter 13 configured to filter out infrared light.

It should be understood that the filter 13 and the photosensitive chip 12 are arranged opposite to each other, and a distance between the filter 13 and the lens 100 is less than a distance between the photosensitive chip 12 and the lens 100. That is, the filter 13 receives light transmitted by the lens 100 and filters out light with a specific wavelength, and then, the filtered light is transmitted to the photosensitive chip 12.

In this embodiment, the second elastic member 80 and the third elastic member 90 may be springs. The permanent magnet 61 may be lodestone. The second coil 71 is also called a focusing coil.

In this embodiment, being energized, the second coil 71 produces an electromagnetic effect with the permanent magnet 61 to generate an Ampere force that drives the moving member 70 to move. The second elastic member 80 and the third elastic member 90 are arranged on two sides of the moving member 70, and both the second elastic member 80 and the third elastic member 90 are perpendicular to the moving member 70, so that the direction of movement of the moving member 70 can be limited by means of the second elastic member 80 and the third elastic member 90. Thereby, the moving member 70 can move only along a direction along which the opening of the fixed member is provided. That is, the lens 100 fixedly connected to the moving member 70 is driven by Ampere force to extend and retract, thereby realizing automatic focusing of the lens 100.

In addition, one end of the second elastic member 80 is fixedly connected to the moving member 70, and the other end of the second elastic member 80 is fixedly connected to the fixed member 60. The second coil 71 is arranged in the first groove of the moving member 70. Since one end of the second elastic member 80 is fixedly connected to the moving member 70, the second coil 71 may be set to be electrically connected to the second elastic member 80. Further, an external pin connected to the fixed member 60 may be arranged on the housing 50. Since the other end of the second elastic member 80 is fixedly connected to the fixed member 60, the second elastic member 80 can be connected to the external pin. In this way, the second coil 71 is electrically connected to the external pin, and the second coil 71 can be electrified by means of the external pin.

An embodiment of this application further provides an electronic device. The electronic device includes a camera assembly. The camera assembly includes a first circuit board 10, a flexible circuit board 20, a base 30, a plurality of first elastic members 40, a first coil 11, and a photosensitive chip 12.

For the connections of the first circuit board 10, the flexible circuit board 20, the base 30, the plurality of first elastic members 40, the first coil 11 and the photosensitive chip 12, reference may be made to the above description. In order to avoid repetition, details will not be repeated. For the specific implementation of the camera assembly, reference may be made to the above description, and the same technical effects can be achieved. In order to avoid repetition, details will not be repeated.

In the embodiments of the present disclosure, the foregoing electronic device may be a computer, a mobile phone, a tablet personal computer, a laptop computer, a personal digital assistant (PDA), a mobile internet device (MID), a wearable device, an e-reader, a navigator, a digital camera, etc.

The embodiments of this application have been described above with reference to the accompanying drawings. However, this application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A camera assembly, comprising a first circuit board, a flexible circuit board, a base, a plurality of first elastic members, a first coil, and a photosensitive chip; wherein
    fixed ends of the plurality of first elastic members are fixedly mounted on the base, and free ends of the plurality of first elastic members are suspended;
    the first circuit board is mounted on a suspension rack formed by the plurality of first elastic members, and the first coil and the photosensitive chip are provided on the first circuit board;
    one end of the flexible circuit board is fixedly connected to the first circuit board, and the other end of the flexible circuit board is fixedly connected to the base,
    wherein being energized, the first coil cooperates with a permanent magnet to drive the first circuit board to drive the photosensitive chip to move;
    wherein the free ends of the first elastic members are located on a bottom of the first circuit board, and the free ends of the first elastic members are fixedly connected to the first circuit board;
    wherein the first elastic member comprises a first connecting portion and a second connecting portion, the fixed end being arranged on the first connecting portion, and the free end being arranged on the second connecting portion; and
    the first connecting portion is located on a first side of the first circuit board, and the second connecting portion is located on a second side of the first circuit board, the first side and the second side being adjacent sides of the first circuit board;
    wherein the first connecting portion is attached to the first side of the first circuit board, and the second connecting portion is attached to the second side of the first circuit board, the first connecting portion and the second connecting portion being perpendicular to each other.

2. The camera assembly according to claim 1, wherein a number of the first elastic members is four; and
    the first circuit board is a rectangular circuit board, and the first elastic members are located at four corners of the first circuit board.

3. The camera assembly according to claim 1, wherein the number of the flexible circuit boards is two; and
    part of the flexible circuit board is connected to the two first connecting portions located on a same side of the first circuit board.

4. The camera assembly according to claim 1, wherein the base is provided with a protrusion, and the protrusion is bonded with part of the flexible circuit board.

5. The camera assembly according to claim 1, wherein the camera assembly further comprises a housing, a fixed member, a moving member and a lens; wherein
    the housing, the fixed member and the moving member are each provided with an opening;
    the housing and the base form a first accommodating cavity, and the moving member and the fixed member are both located in the first accommodating cavity;
    the fixed member is fixedly connected to the housing, and the moving member is located in the fixed member; and
    one end of the lens is bonded with the moving member, and the other end of the lens runs through the opening of the housing and is located outside the housing.

6. The camera assembly to claim 5, wherein the camera assembly further comprises a filter, a second elastic member, a third elastic member, a second coil, and a permanent magnet; wherein the filter is fixedly connected to the first circuit board, and the filter is arranged opposite to the photosensitive chip;

the second elastic member, the third elastic member, the second coil and the permanent magnet are all located in the first accommodating cavity;

the fixed member and the moving member form a second accommodating cavity and a third accommodating cavity on two opposite sides of the moving member;

the second elastic member is located in the second accommodating cavity, and the second elastic member is perpendicular to the moving member; the third elastic member is located in the third accommodating cavity, and the third elastic member is perpendicular to the moving member; and the second coil is located in a first groove of the moving member, and the permanent magnet is located in a second groove of the fixed member, the permanent magnet and the second coil being arranged opposite to each other.

7. An electronic device, comprising a camera assembly, wherein the camera assembly comprises a first circuit board, a flexible circuit board, a base, a plurality of first elastic members, a first coil, and a photosensitive chip;

fixed ends of the plurality of first elastic members are fixedly mounted on the base, and free ends of the plurality of first elastic members are suspended;

the first circuit board is mounted on a suspension rack formed by the plurality of first elastic members, and the first coil and the photosensitive chip are provided on the first circuit board;

one end of the flexible circuit board is fixedly connected to the first circuit board, and the other end of the flexible circuit board is fixedly connected to the base, wherein being energized, the first coil cooperates with a permanent magnet to drive the first circuit board to drive the photosensitive chip to move;

wherein the free ends of the first elastic members are located on a bottom of the first circuit board, and the free ends of the first elastic members are fixedly connected to the first circuit board;

wherein the first elastic member comprises a first connecting portion and a second connecting portion, the fixed end being arranged on the first connecting portion, and the free end being arranged on the second connecting portion; and the first connecting portion is located on a first side of the first circuit board, and the second connecting portion is located on a second side of the first circuit board, the first side and the second side being adjacent sides of the first circuit board;

wherein the first connecting portion is attached to the first side of the first circuit board, and the second connecting portion is attached to the second side of the first circuit board, the first connecting portion and the second connecting portion being perpendicular to each other.

8. The electronic device according to claim 7, wherein a number of the first elastic members is four; and the first circuit board is a rectangular circuit board, and the first elastic members are located at four corners of the first circuit board.

9. The electronic device according to claim 7, wherein the number of the flexible circuit boards is two; and part of the flexible circuit board is connected to the two first connecting portions located on a same side of the first circuit board.

10. The electronic device according to claim 7, wherein the base is provided with a protrusion, and the protrusion is bonded with part of the flexible circuit board.

11. The electronic device according to claim 7, wherein the camera assembly further comprises a housing, a fixed member, a moving member and a lens; wherein the housing, the fixed member and the moving member are each provided with an opening;

the housing and the base form a first accommodating cavity, and the moving member and the fixed member are both located in the first accommodating cavity;

the fixed member is fixedly connected to the housing, and the moving member is located in the fixed member; and one end of the lens is bonded with the moving member, and the other end of the lens runs through the opening of the housing and is located outside the housing.

12. The electronic device of claim 11, wherein the camera assembly further comprises a filter, a second elastic member, a third elastic member, a second coil, and a permanent magnet; wherein the filter is fixedly connected to the first circuit board, and the filter is arranged opposite to the photosensitive chip;

the second elastic member, the third elastic member, the second coil and the permanent magnet are all located in the first accommodating cavity;

the fixed member and the moving member form a second accommodating cavity and a third accommodating cavity on two opposite sides of the moving member;

the second elastic member is located in the second accommodating cavity, and the second elastic member is perpendicular to the moving member; the third elastic member is located in the third accommodating cavity, and the third elastic member is perpendicular to the moving member; and the second coil is located in a first groove of the moving member, and the permanent magnet is located in a second groove of the fixed member, the permanent magnet and the second coil being arranged opposite to each other.

* * * * *